(12) United States Patent
Seker

(10) Patent No.: US 8,950,667 B2
(45) Date of Patent: Feb. 10, 2015

(54) QUICK RESPONSE (QR) SECURE SHAKE

(71) Applicant: Niv Seker, San Francisco, CA (US)

(72) Inventor: Niv Seker, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/709,345

(22) Filed: Dec. 10, 2012

(65) Prior Publication Data

US 2014/0158760 A1   Jun. 12, 2014

(51) Int. Cl.
*G06F 17/00* (2006.01)
*G06K 5/00* (2006.01)
*G06K 7/00* (2006.01)
*G06K 19/00* (2006.01)
*G06K 19/06* (2006.01)
*G06Q 99/00* (2006.01)
*G06F 17/30* (2006.01)

(52) U.S. Cl.
CPC .............................. *G06F 17/30943* (2013.01)
USPC ...... 235/380; 235/375; 235/462.01; 235/487; 235/492; 705/319

(58) Field of Classification Search
USPC ................ 235/375, 380, 487, 492, 435, 494, 235/462.01; 705/319
See application file for complete search history.

(56) References Cited

U.S. PATENT DOCUMENTS

| | | | |
|---|---|---|---|
| 2010/0095343 A1* | 4/2010 | Kaihotsu | 725/118 |
| 2012/0089519 A1* | 4/2012 | Peddada | 705/71 |
| 2012/0211557 A1* | 8/2012 | Harris | 235/375 |
| 2013/0042326 A1* | 2/2013 | Matus | 726/28 |

* cited by examiner

*Primary Examiner* — Michael G Lee
*Assistant Examiner* — Laura Gudorf
(74) *Attorney, Agent, or Firm* — Baker Botts L.L.P.

(57) ABSTRACT

In one embodiment, a computing device of a social-networking system may receive from a computing device of a first user of the social-networking system information acquired by the computing device of the first user from a tag associated with a second user of the social-networking system. The tag may encode a time stamp, a signature, and a social action on the social-networking system. The computing device of the social-networking system may verify the signature and, if the signature is verified, then initiate the social action.

20 Claims, 4 Drawing Sheets

QUICK RESPONSE (QR) SECURE SHAKE

TECHNICAL FIELD

This disclosure generally relates to social graphs.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments may use a tag such as a Quick Response (QR) code or an Near Field Communication (NFC) tag to initiate a social action between two users of a social-networking system. For example, a social action may be a first user's request for establishing a friend relationship with a second user in the social-networking system. The second user's computing device may generate a QR code that encodes the social action, a time stamp, and a signature generated from the time stamp and an access token to the social-networking system for the second user. The first user's computing device may then acquire and decode the QR code, and send the social action, the time stamp, and the signature decoded from the QR code to the social-networking system. The social-networking system may then verify the signature. The social-networking system may perform the social action if the signature is verified.

DESCRIPTION OF EXAMPLE EMBODIMENTS

Figure 1:
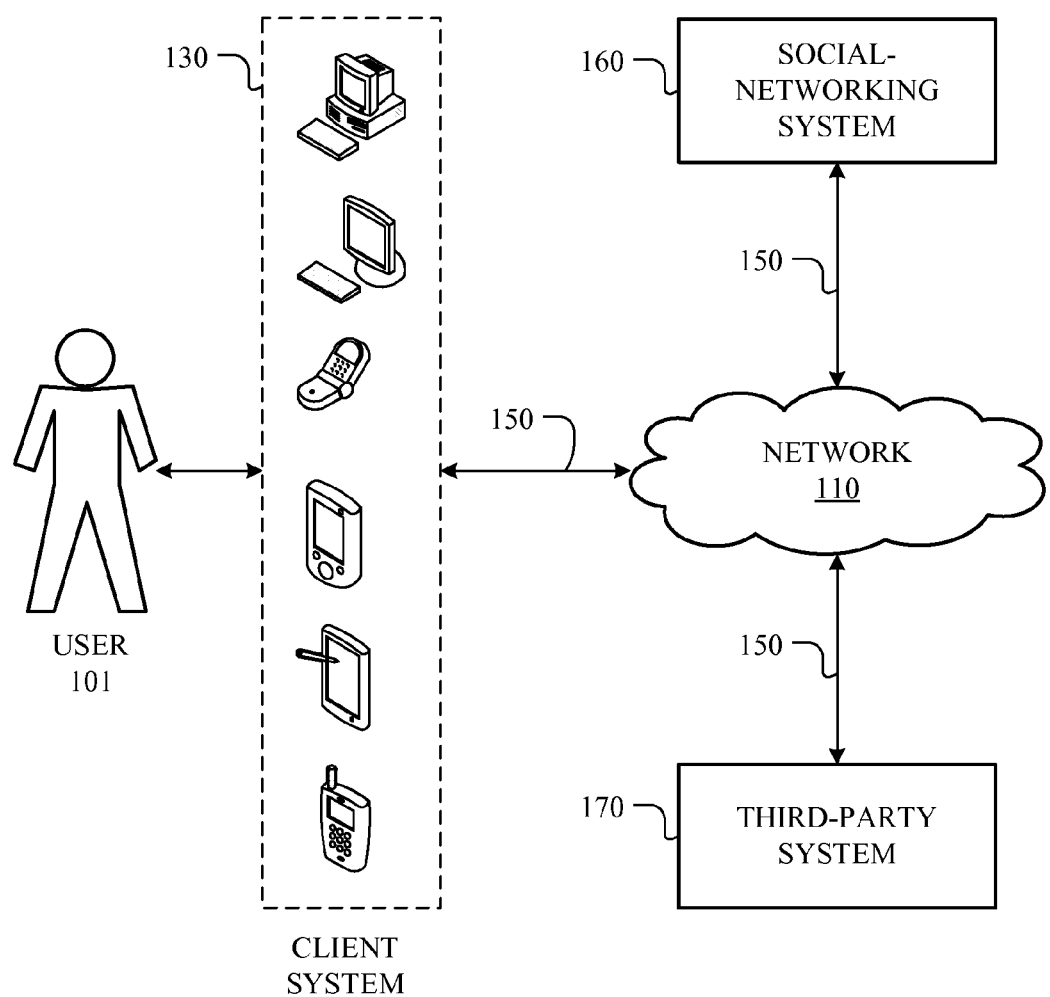
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g. an enterprise, business, or third-party application), or a group (e.g. of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g. third-party systems 170), such as, for example, by setting appropriate privacy settings. In particular embodiments, third-party system 170 may be a network-addressable computing system that can host websites or applications. Third-party system 170 may generate, store, receive, and send third-party system data, such as, for example and without limitation, web pages, text, images, video, audio, or applications. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
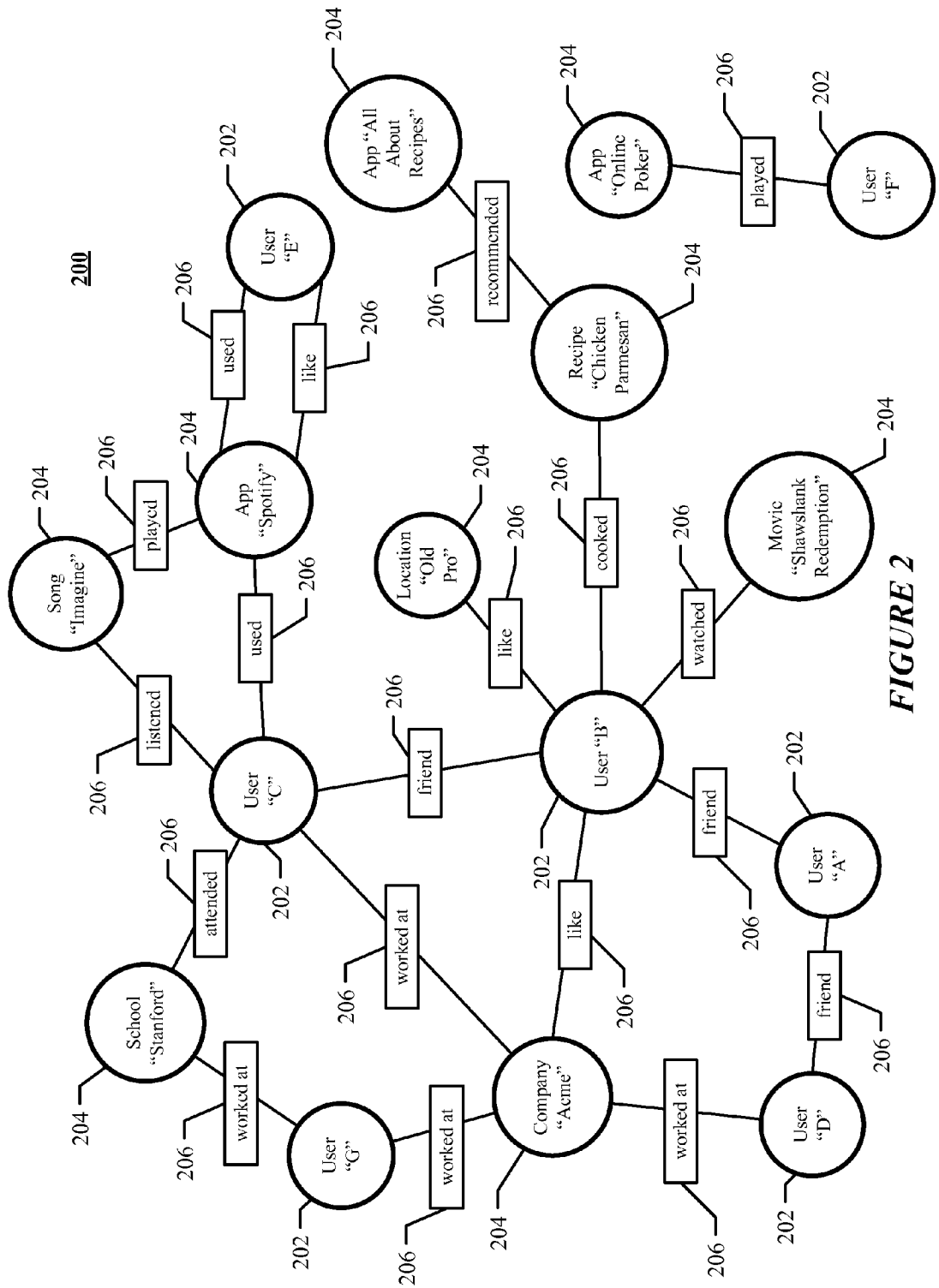
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to send to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

As described earlier, a user may cause the social-networking system to create a social relationship or action (e.g., creating a "friend", "check in", or "like" edge in a social graph of the social networking system) by selecting a selectable icon displayed in a web page. Particular embodiments describe methods for initiating a social action in the social networking system using a tag such as a Quick Response (QR) code. Particular embodiments may create between two users of the social-networking system a social action that requires permission from both users. For example, particular embodiments may create a "friend" relation, or generate a list of common friends, between two users of the social-networking system by using a QR code exchanged from one to another of the two users.

Figure 3:
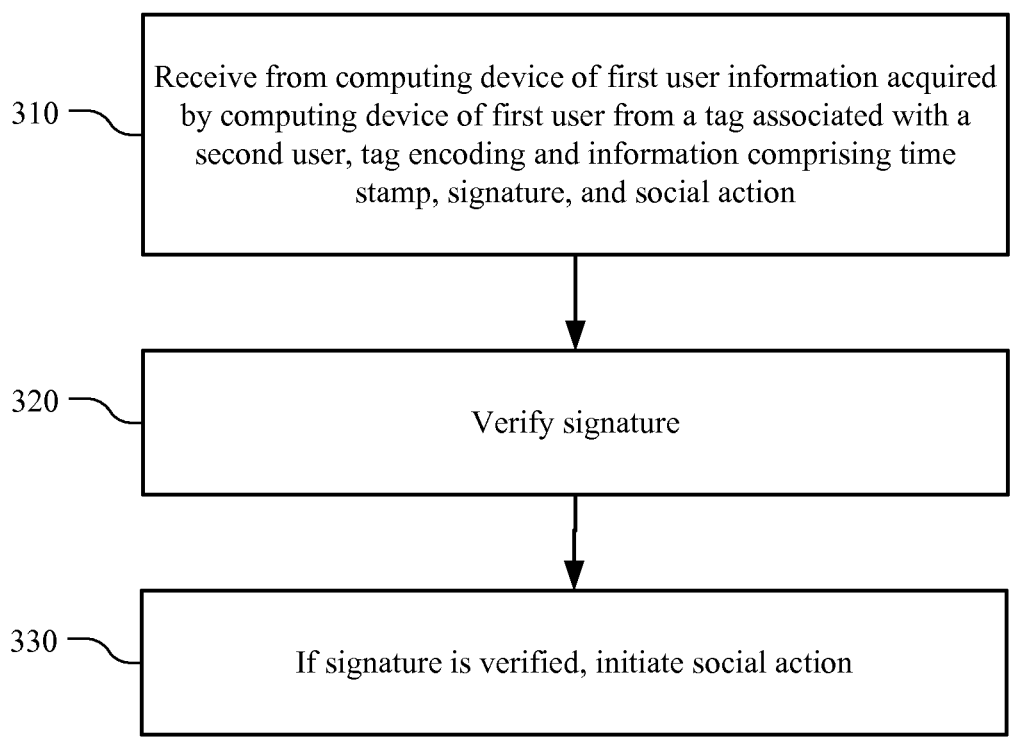
FIG. 3 illustrates an example method for initiating a social action.

FIG. 3 illustrates an example method 300 for initiating a social action. The method 300 may be implemented by a computing device (e.g., a server) of the social-networking system. For example, the method 300 may be implemented by one or more programs or processes executing on one or more processors of the computing device of the social-networking system. The method 300 may begin at step 310. In particular embodiments, at step 310, a computing device of a social-networking system may receive from a computing device of a first user of the social-networking system information acquired by the computing device of the first user from a tag associated with a second user of the social-networking system. As described earlier, the social-networking system may comprise a social graph that comprises a plurality of nodes and edges connecting the nodes. At least one node (e.g., a user node) may correspond to the first user, while at least another node (e.g., another user node) may correspond to the second user. In particular embodiments, the tag may comprise a Quick Response (QR) code, an Near Field Communication (NFC) tag, a radio-frequency identification (RFID) tag, or any suitable one- or two-dimensional barcode. In particular embodiments, the tag may encode a time stamp, a signature, and a social action on the social-networking system. That is, the information acquired by the computing device of the first user (and received by the computing device of the social-networking system) may comprise the time stamp, the signature, and the social action.

For example, the first user may make a request to the second user for initiating a social action in establishing a friend relationship (a "friend request") with the second user. The social action may comprise creating an edge (a "friend" edge) between a user node in the social graph corresponding to the first user and another user node in the social graph corresponding to the second user. For another example, the first user may make a request to the second user for a list of mutual friends between the first user and the second user. The social action may comprise generating of list of nodes in the social graph, each node of the list connecting to a user node in the social graph corresponding to the first user and to another user node in the social graph corresponding to the second user. For yet another example, the first user may make a request to the second user for initiating a social action in a payment from the second user to the first user (or from the first user to the second user). The payment may be in any suitable real or virtual currencies (e.g., one US dollar, a hundred Monopoly dollar). The payment may be in any suitable digital or virtual goods (e.g., three avatars of an online game). The social action in payment may comprise creating in the social graph an edge (a directional edge) connecting from a user node corresponding to the second user to another user node corresponding to the first user (or from a user node corresponding to the first user to another user node corresponding to the second user if the payment is from the first user to the second user). The social action may also cause a transaction of the payment by the social-networking system or another service (e.g., a financial institution, an online gaming service, and so on). Particular embodiments contemplates any suitable social actions on the social-networking system associated with the first user and the second user. Note that there is not necessarily an existing relationship between the first and second users in the social-networking system (e.g., an existing edge in the social graph between the nodes corresponding to the first and second users).

In response to the first user's request for the social action, the second user may allow the social action by causing the computing device of the second user to generate a tag. For example, the second user may access an application executing on one or more processors of the computing device of the second user (e.g., a smart phone, a tablet computer, and so on), causing the application to create a QR code (or any suitable one- or two-dimensional barcode) and display the QR code in a graphical user interface of the application. The QR code may encode a time stamp, a signature, and the social action (as requested by the first user). The application (or another process on the computing device) may generate the signature based on the time stamp and an access token for accessing the social-networking system by the second user. For example, the application may generate the signature from the time stamp and the access token using Secure Hash Algorithm 1 (SHA 1), or any suitable cryptographic algorithms. Particular embodiments contemplate any suitable methods for securely generating the signature based at least in part on a credential of the second user.

The first user may acquire the QR code by scanning the QR code with his/her computing device (e.g., a camera phone). For example, an application (or process) executing on one or more processors of the computing device of the second user (e.g., a smart phone, a tablet computer, and so on) may access a camera function of the computing device to capture the QR code shown in a graphical user interface displayed by the computing device of the second user. The application may decode the QR code and send the information decoded from the QR code (i.e., the time stamp, the signature, and the social action) to the social-networking system. The application may also send a user identifier or an access token of the first user for accessing the social-networking system. In some embodiments, the QR code may further encode (by the computing device of the second user) a Uniform Resource Locator (URL) including a network address of the social-networking system. The application on the computing device of the first user may send the time stamp, the signature, and the social action to the social-networking system securely based on the URL using Hypertext Transfer Protocol Secure (HTTPS) protocol. For example, the URL may comprise an HTTPS URL https://graphs.facebook.com/mutual_friends/time_stamp=ABCD&sig=WXYZ including a social action ("graphs.facebook.com/mutual_friends"), a time stamp ("ABCD"), and a signature ("WXYZ").

In particular embodiments, at step 320, the computing device of the social-networking system may verify the signature received from the computing device of the first user. For example, the computing device may extract and verify the access token (of the second user) encoded in the signature. That is, the computing device may verify whether the social action is allowed by the second user based on a credential (e.g., the access token) of the second user. The computing device may also verify whether the access token has expired. The computing device may also verify whether the time stamp is consistent with a time stamp extracted from the signature. In one embodiment, the computing device may determine that the signature is valid if the time stamp corresponds to a time that is within a pre-determined period of time from a current time—i.e., if the first user sends the social action, the time stamp, and the signature encoded in the QR code to the social-networking system within the pre-determined period of time (e.g., 2 hours) after acquiring the QR code.

In particular embodiments, at step 330, the computing device of the social networking system may initiate the social action if the signature is verified (i.e., the second user allows the social action). For example, for the social action of establishing a friend relationship between the first and the second users described earlier, the computing device may create a "friend" edge in the social graph between the user nodes corresponding to the first and second users. For example, for the social action for generating a list of common friends between the first and the second users described earlier, the computing device may generate a list of nodes in the social graph, each node of the list connecting to both user nodes corresponding to the first and the second users. For example, for the social action in a payment from the second user to the first user described earlier, the computing device may create in the social graph a directional edge (representing the payment) connecting from the user node corresponding to the second user to the user node corresponding to the first user. In particular embodiments, the computing device of the social-networking system may send a message to the computing device of the first user (or the second user) corresponding to the social action. For example, the message may comprise a confirmation that the friend relationship has been established between the first and second users in the social-networking system. For example, the message may comprise a list of common friends corresponding to the list of nodes in the social graph described above. For example, the message may comprise a confirmation of the payment.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
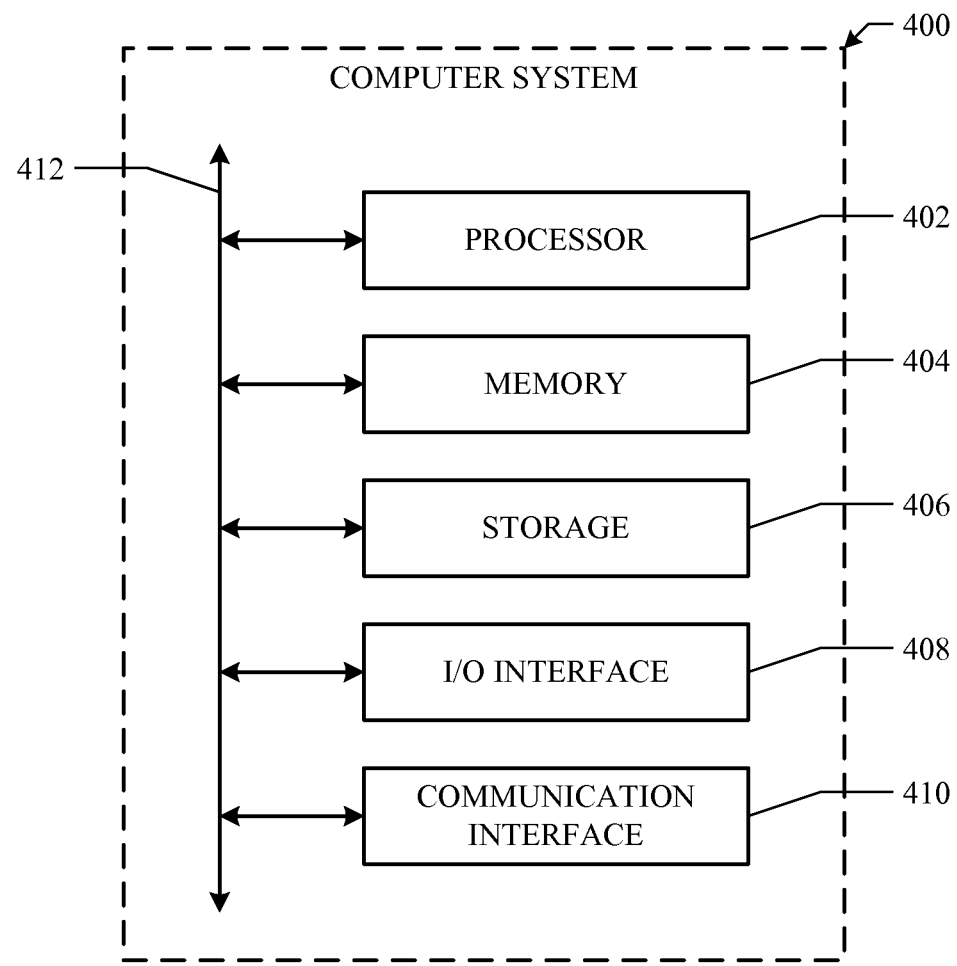
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a computing device of a social-networking system, receiving from a computing device of a first user of the social-networking system information acquired by the computing device of the first user from a tag associated with a second user of the social-networking system, the tag encoding and the information comprising a time stamp, a signature, and a social action on the social-networking system, the social-networking system comprising a graph that comprises a plurality of nodes and edges connecting the nodes, at least one node in the graph corresponding to the first user, and at least one node in the graph corresponding to the second user;
by the computing device of the social-networking system, verifying the signature; and
by the computing device of the social-networking system, initiating the social action in response to verifying the signature, the social action as initiated being associated with the at least one node in the graph corresponding to the first user and the at least one node in the graph corresponding to the second user,
wherein the signature comprises at least a credential of the second user that is associated with the social-networking system.

2. The method of claim 1, wherein the tag comprises a Quick Response (QR) code, a Near Field Communication (NFC) tag, or a radio-frequency identification (RFID) tag.

3. The method of claim 1, wherein initiating the social action comprises causing a message to be sent to the computing device of the first user corresponding to the social action.

4. The method of claim 1, wherein the signature is generated based at least in part on the time stamp and a social-networking-system access token of the second user.

5. The method of claim 4, wherein the signature is generated with Secure Hash Algorithm 1 (SHA 1).

6. The method of claim 1, wherein the tag further encodes a Uniform Resource Locator (URL).

7. The method of claim 6, wherein the computing device of the first user sends the information to the URL using Hypertext Transfer Protocol Secure (HTTPS) protocol.

8. The method of claim 1, wherein the social action comprises creating an edge to or from at least one node in the graph corresponding to the first user or at least one node in the graph corresponding to the second user.

9. The method of claim 1, wherein the social action comprises generating a list of nodes connected by edges to at least one node in the graph corresponding to the first user or at least one node in the graph corresponding to the second user.

10. One or more computer-readable non-transitory storage media embodying software that is operable when executed by a computing device to:
receive from a computing device of a first user of a social-networking system information acquired by the computing device of the first user from a tag associated with a second user of the social-networking system, the tag encoding and the information comprising a time stamp, a signature, and a social action on the social-networking system, the social-networking system comprising a graph that comprises a plurality of nodes and edges connecting the nodes, at least one node in the graph corresponding to the first user, and at least one node in the graph corresponding to the second user;
verify the signature; and
initiate the social action in response to verifying the signature, the social action as initiated being associated with the at least one node in the graph corresponding to the first user and the at least one node in the graph corresponding to the second user,
wherein the signature comprises at least a credential of the second user that is associated with the social-networking system.

11. The media of claim 10, wherein the tag comprises a Quick Response (QR) code, a Near Field Communication (NFC) tag, or a radio-frequency identification (RFID) tag.

12. The media of claim 10, wherein, to initiate the social action, the software is operable when executed by the computing device to cause a message to be sent to the computing device of the first user corresponding to the social action.

13. The media of claim 10, wherein the signature is generated based at least in part on the time stamp and a social-networking-system access token of the second user.

14. The media of claim 13, wherein the signature is generated with Secure Hash Algorithm 1 (SHA 1).

15. The media of claim 10, wherein the tag further encodes a Uniform Resource Locator (URL).

16. The media of claim 15, wherein the computing device of the first user sends the information to the URL using Hypertext Transfer Protocol Secure (HTTPS) protocol.

17. The media of claim 10, wherein the social action comprises creating an edge to or from at least one node in the graph corresponding to the first user or at least one node in the graph corresponding to the second user.

18. The media of claim 10, wherein the social action comprises generating a list of nodes connected by edges to at least one node in the graph corresponding to the first user or at least one node in the graph corresponding to the second user.

19. A system comprising:
one or more processors; and
a memory coupled to the processors comprising instructions executed by the processors, the processors being operable when executing the instructions to:
receive from a computing device of a first user of a social-networking system information acquired by the computing device of the first user from a tag associated with a second user of the social-networking system, the tag encoding and the information comprising a time stamp, a signature, and a social action on the social-networking system, the social-networking system comprising a graph that comprises a plurality of nodes and edges connecting the nodes, at least one node in the graph corresponding to the first user, and at least one node in the graph corresponding to the second user;

verify the signature; and initiate the social action in response to verifying the signature, the social action as initiated being associated with the at least one node in the graph corresponding to the first user and the at least one node in the graph corresponding to the second user, wherein the signature comprises at least a credential of the second user that is associated with the social-networking system.

20. The system of claim 19, wherein the tag comprises a Quick Response (QR) code, a Near Field Communication (NFC) tag, or a radio-frequency identification (RFID) tag.

* * * * *